July 10, 1928.

J. T. PEDERSEN 1,676,918

FORK TINE STRAIGHTENER

Filed Nov. 23, 1926

INVENTOR
Johannes Th. Pedersen
BY
his ATTORNEYS

July 10, 1928.
J. T. PEDERSEN
1,676,918
FORK TINE STRAIGHTENER
Filed Nov. 23, 1926        2 Sheets-Sheet 2
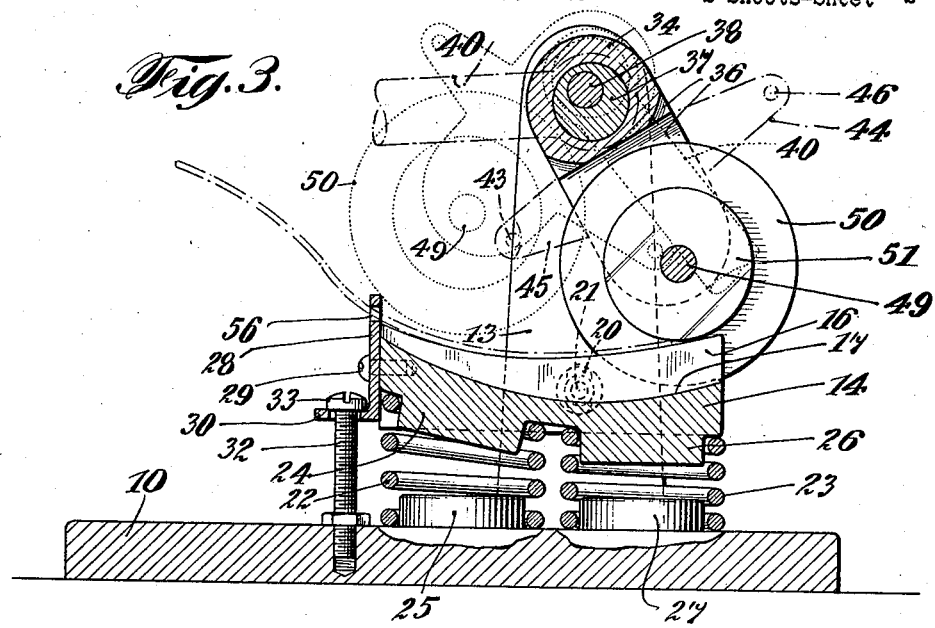
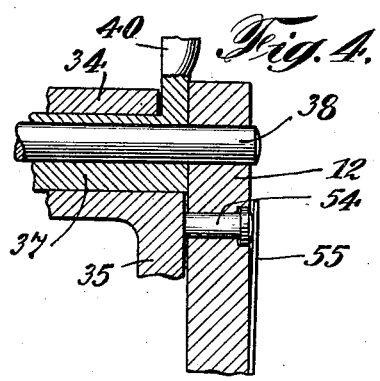
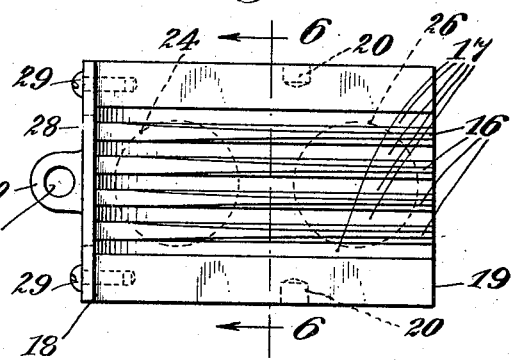
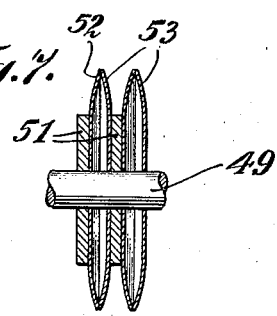
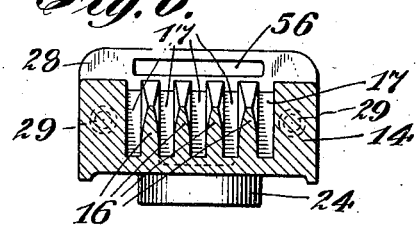
INVENTOR
Johannes Th. Pedersen
BY
his ATTORNEYS Patented July 10, 1928.

1,676,918

UNITED STATES PATENT OFFICE.

JOHANNES TH. PEDERSEN, OF FLUSHING, NEW YORK.

FORK-TINE STRAIGHTENER.

Application filed November 23, 1926. Serial No. 150,178.

In hotels, restaurants, cafés and similar places where the table utensils are in practically constant use the knives, forks and spoons are often subjected to unduly rough usage. This in so far as the forks are concerned often results in the bending of the tines out of shape and making it necessary to straighten the same in order that they may be maintained in a presentable and usable condition. Heretofore, so far as I am aware, it has been customary to straighten fork tines by hand and the use of pliers or other suitable tools. Obviously, this is more or less of a laborious operation and one which consumes a relatively large amount of time. The object of my present invention is the provision of an apparatus by which fork tines may be easily and quickly straightened when bent out of shape whereby the forks may be kept in presentable shape with a minimum expenditure of time and labor.

In carrying out the invention as hereinafter described the apparatus made in accordance therewith includes a base, a yieldingly mounted block, a swinging member adapted to cooperate with the block with the tines of a fork intervening, and means for operating the swinging frame to move the same across the block thereby to straighten the bent tines of the fork.

The particular construction of the parts of the device to which reference has hereinbefore been generally made will be hereinafter more particularly described in conjunction with the accompanying drawings in which Figure 1 is a side elevation of the fork tine straightener made in accordance with my invention.

Fig. 3 is a sectional elevation on line 3—3, Fig. 2 illustrating the swinging frame and parts associated therewith in oppositely disposed positions, one of which is indicated in dotted lines.

Fig. 4 is a section on line 4—4, Fig. 1.

Fig. 5 is a plan view of the block.

Fig. 6 is a section on line 6—6, Fig. 5, and

Fig. 7 is a section illustrating the construction of the disks and washers associated therewith.

Figure 1:
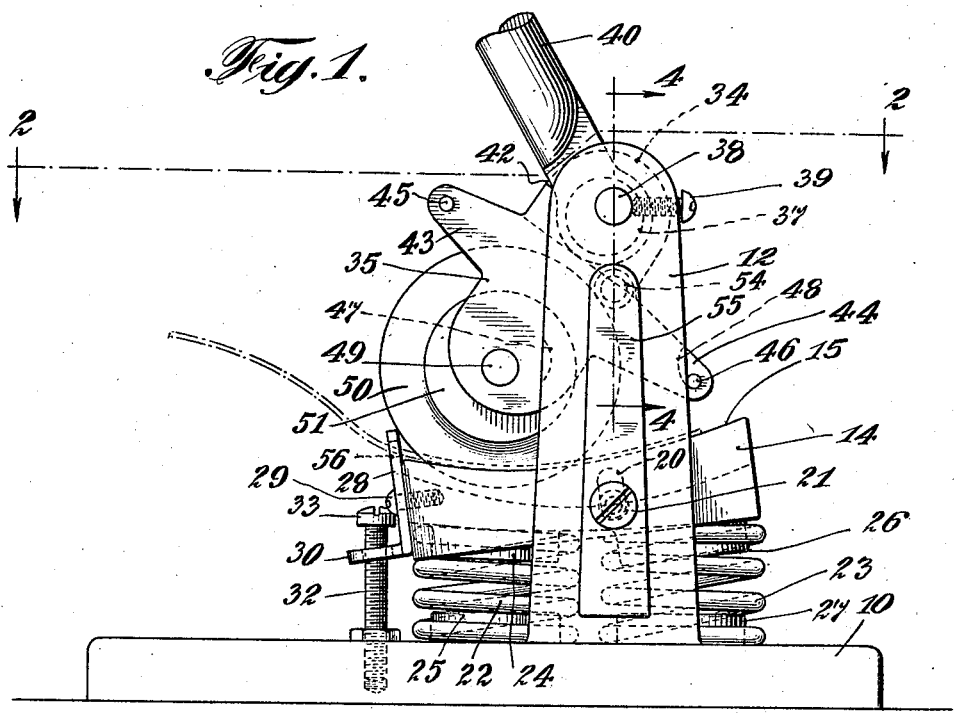
Figure 2:
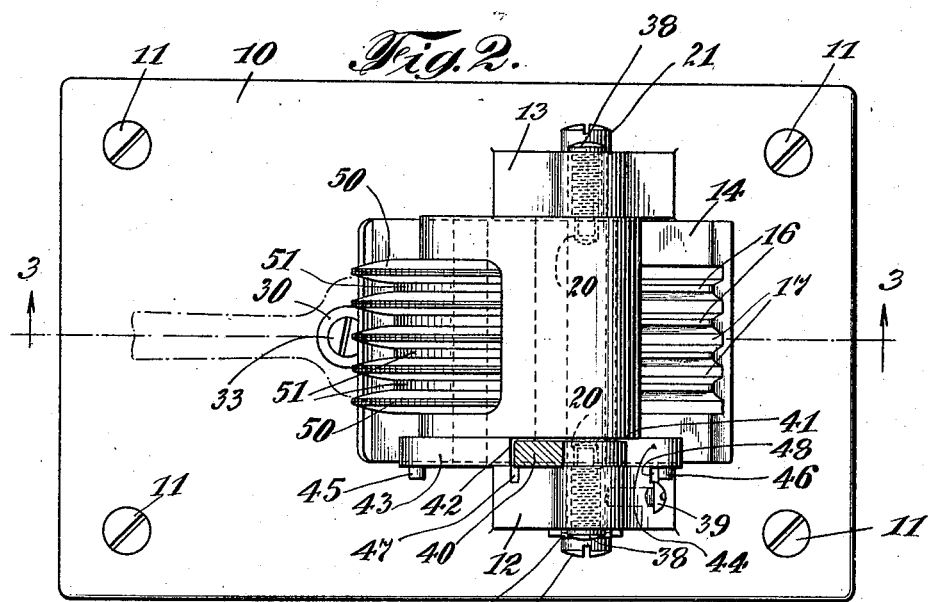
Fig. 2 is a sectional plan on line 2—2, Fig. 1.

By reference to the drawing it will be seen that in carrying out the invention the fork tine straightener made in accordance therewith is constructed to include a base 10 which by suitable screws 11 or otherwise may be connected to a table or other support so as to be maintained in a fixed position thereon. It will be understood, however, that it is not necessary in the use of the apparatus to have the same secured to any support. Extending upwardly from the base 10 there are oppositely placed standards 12 and 13. Between these standards is a block or bed member 14. This is preferably rectangular in plan and the upper surface 15 of which is slightly concave and provided with a series of ribs 16 and intervening grooves 17. The upper faces of the ribs 16 preferably taper from the front end 18 to the rear end 19 of the block, and the side faces of the ribs 16 are preferably inclined as is clearly indicated in Figs. 5 and 6 of the drawing.

In the opposite faces of the block there are slots 20 for the reception of the ends of screw trunnions 21 which extend through the standards 12 and 13 and into the slots 20 whereby the block is secured in place between the standards and is movable in a substantially vertical direction between the same. As illustrated in the drawing, the block is supported upon springs 22 and 23 so as to be furthermore yieldingly mounted between the standards. To this end the lower face of the block is provided with a lug 24 and the upper surface of the base with a lug 25. The ends of the spring 22 extend over these lugs 24 and 25 and are maintained in position thereby. Similarly at the other end the block is provided with a lug 26 and on the base there is a lug 27. The ends of the spring 23 extend over these lugs whereby the spring is maintained in position thereby. It will be understood, however, that other equivalent and equally advantageous means may be employed for yieldingly mounting the block on the base between the standards.

At the front or forward end of the block 14 there is a bracket 28. This bracket is secured in position by means of screws 29 or otherwise and at its lower end includes an arm 30 through a hole 31 in which an adjusting screw 32 passes. This adjusting screw may be turned down to any desired extent in a tapped opening provided therefor in the base so as to determine the position in which the arm 30 will engage the head 33 of the screw as indicated in Fig. 3 of the drawing.

Mounted between the upper ends of the standards 12 and 13 there is a swinging frame comprising a head 34 and a pair of oppositely disposed jaws 35 and 36. Extending through a bore in the head 34 there is an eccentric sleeve 37. A pin 38 passes through the eccentric sleeve 37 and also through the walls of the standards 12 and 13 in which the pin may be fixed in position by means of a set screw 39 or otherwise. The eccentric sleeve 37 is provided with a handle 40 for operating the same. This handle is preferably placed at one end of the sleeve and at the corresponding end the head 34 is cut away as indicated at 41 making provision for the movement of the handle and also providing a shoulder 42 against which the handle is adapted to abut in operating the swinging frame as hereinafter described. At one side thereof the swinging frame also includes arms 43 and 44. These arms are provided with pins 45 and 46 which function as stop pins by engaging respectively in recesses 47 and 48 made for this purpose in the edge portions of the standard 12.

Journaled in the jaws 35 and 36 there is a shaft 49. Mounted on this shaft 49 there is a series of disks 50 and intervening washers 51. Each disk 50 is preferably composed of two oppositely disposed steel or other sheet metal plates 52, 53 which are suitably pressed or otherwise formed into a cup shape so that when placed together as clearly illustrated in Fig. 7 these plates form a compressible or yielding disk. Between each disk as hereinbefore stated, there is a washer 51 and the disks and the washers extend between the jaws 35 and 36 and are revolubly mounted on the shaft 49.

The number of the disks employed corresponds with the number of grooves in the block 14 and inasmuch as it is customary to make forks with four tines, in the apparatus as illustrated there are four ribs 16 and five grooves 17 and 5 of the disks 50.

As illustrated, the swinging head may be yieldingly maintained in position in contact with the inner face of the standard 13 by means of a pin 54 passing through an aperture provided therefor in the standard 12 and carried by a spring 55 which may be secured in position by means of the head of the screw 21 which passes through this standard 12.

In the construction of the apparatus as hereinbefore described, the upper faces of the ribs 16 in the block are made to conform generally to the configuration in plan of the tines of a fork and are correspondingly placed so that in the use of the apparatus a fork may be passed through a slot 56 in the bracket 28 which slot acts as a guide and spacer for the fork so that the tines of the fork lie upon the upper faces of the ribs of the block. When this is done the parts of the apparatus are in substantially the position shown in dotted lines in Fig. 3 and in which the handle may be in contact with the arm 44 and the disks and washers in the swinging frame are sufficiently spaced from the upper surface of the block to permit the insertion and proper placing of the fork. With the fork thus in position the handle is swung counter clockwise as viewed in Figs. 1 and 3 to the position indicated in Fig. 1 in which the handle abuts against the shoulder 42. Before the handle reaches this position however, due to the eccentric sleeve turning in the head the frame of which the head is a part is moved downwardly to bring the edges of the disks into contact with the edges of the tines of the fork and to permit the peripheral portions of the disks to extend into the grooves of the block. Then as will be understood, the disks are in more or less forceful contact with the tines of the fork. Thereafter, and by the continued movement of the handle in this counter-clockwise position as indicated in Figs. 1 and 3 the swinging frame may be moved from the full line position as shown in Fig. 1 to the full line position shown in Fig. 3. In so doing the swinging head is moved against the block depressing the same against the action of the springs 22 and 23 and bringing the disks into more forceful contact with the tines of the fork and pressing the same between the disks, which may yield to a slight extent, and the surfaces of the ribs. It will be understood that the inclined oppositely disposed faces of the ribs are set at an angle which corresponds approximately with the tapered peripheral portions of the disks so that as the swinging frame is moved from one operative position to the other the disks are at all times maintained in contact with the tines of the fork and in such a manner as to also maintain the tines of the fork against the upper or outer faces of the ribs whereby if crooked or bent out of shape the tines of the fork will be straightened. After reaching the extreme end of the travel of the swinging head which is indicated in Fig. 3 the fork may be removed from the apparatus. This position as will now be understood is determined by the stop pin 45 coming into contact with the base of the recess 47 as clearly indicated in Fig. 3 of the drawing, whereas the extreme movement of the swinging frame in the other direction is limited and determined by the stop pin 46 coming into contact with the base of the recess 48 as is indicated in Fig. 1 if the drawing.

It will be understood that the apparatus herein shown and described is more or less illustrative of the construction of an apparatus in which my present invention may be embodied, inasmuch as various other and equivalent constructions may be employed without departing from the nature and spirit of the invention; for example the head member cooperating with the block to straighten the tines of a fork may be actuated by any suitable means and caused to move in any necessary manner or direction instead of swinging across the block as illustrated in the form of the invention shown in the drawings and hereinbefore particularly described.

I claim as my invention:

1. In a fork tine straightener, a base, a block yieldingly mounted on the base, a swinging frame, means for moving the swinging frame across the face of the block, and a revoluble member carried by the swinging frame and adapted to cooperate with a fork placed between the same and the block for straightening the tines of the fork as the said revoluble member is carried by the frame across the face of the block.

2. In a fork tine straightener, a base, a block yieldingly mounted on the base and having a plurality of spaced ribs in the upper face thereof, a swinging frame, a member carried by the swinging frame and adapted to cooperate with the ribs in the block for straightening the tines of a fork intervening between the same, and means for actuating the swinging frame to move the revoluble member mounted therein across the face of the block.

3. In a fork tine straightener, a base, standards extending from the base, a swinging frame, an eccentric sleeve journaled in the frame, a pin extending through the eccentric sleeve and fixed in the said standards, means for turning the eccentric sleeve, and devices carried by the swinging frame and adapted to cooperate with the said block with a fork intervening to straighten the tines of a fork.

4. In a fork tine straightener, a base, standards extending from the base, a swinging frame, an eccentric sleeve journaled in the frame, a pin extending through the eccentric sleeve and fixed in the said standards, means for turning the eccentric sleeve, devices carried by the swinging frame and adapted to cooperate with the said block with a fork intervening to straighten the tines of a fork, and means for limiting the extent of the movement of the swinging frame.

5. In a fork tine straightener, a base, standards extending from the same, a block mounted on the base between the said standards, the upper surface of the block being provided with a series of spaced ribs, a swinging frame comprising a head and spaced jaws adapted to move between the said standards, an eccentric sleeve journaled in the said head, a pin passing through the said eccentric sleeve and fixed in the said standards, means for turning the eccentric sleeve for raising and lowering the swinging frame and moving the same across the face of the block, and devices carried by the said swinging frame for cooperating with the said block and the ribs in the upper face thereof for straightening the tines of a fork as the said devices are moved across the face of the block.

6. In a fork tine straightener, a base, standards extending from the same, a block mounted on the base between the said standards, the upper surface of the block being provided with a series of spaced ribs, a swinging frame comprising a head and spaced jaws adapted to move between the said standards, an eccentric sleeve journaled in the said head, a pin passing through the said eccentric sleeve and fixed in the said standards, means for turning the eccentric sleeve for raising and lowering the swinging frame and moving the same across the face of the block, and a plurality of spaced disks revolubly mounted in the swinging frame and adapted to extend between and to cooperate with the said ribs in the block with a fork intervening to straighten the tines of the fork when the said disks are moved across the face of the block by the swinging frame.

7. In a fork tine straightener, a base, standards extending from the same, a block mounted on the base between the said standards, the upper surface of the block being provided with a series of spaced ribs, a swinging frame comprising a head and spaced jaws adapted to move between the said standards, an eccentric sleeve journaled in the said head, a pin passing through the said eccentric sleeve and fixed in the said standards, means for turning the eccentric sleeve for raising and lowering the swinging frame and moving the same across the face of the block, and a plurality of disks and intervening washers revolubly mounted between the jaws of the said swinging frame, each of the said disks comprising a pair of cup shape metal plates placed together to form a laterally compressible unit adapted to extend between adjacent ribs in the said block and to engage the sides of the tines of a fork to straighten the same as the disks are carried across the block by the said swinging head.

8. In a fork tine straightener, a block, a frame, a member movably mounted in the said frame, and means for moving the said frame and the member mounted therein across the face of the block, the said member movably mounted in the frame being adapted to cooperate with a fork placed between the same and the block for straightening the tines of the fork as the said member and frame are moved across the face of the block.

Signed by me this 27th day of October, 1926.

JOHANNES TH. PEDERSEN.